US012425200B2

United States Patent
De Los Santos

(10) Patent No.: US 12,425,200 B2
(45) Date of Patent: Sep. 23, 2025

(54) SYSTEM FOR QUANTUM FIELD NOISE SOURCE AND SECURE INFORMATION TRANSFER THEREFROM

(71) Applicant: Hector J. De Los Santos, Irvine, CA (US)

(72) Inventor: Hector J. De Los Santos, Irvine, CA (US)

(*) Notice: Subject to any disclaimer, the term of this patent is extended or adjusted under 35 U.S.C. 154(b) by 317 days.

(21) Appl. No.: 18/195,357

(22) Filed: May 9, 2023

(65) Prior Publication Data

US 2023/0370256 A1 Nov. 16, 2023

Related U.S. Application Data

(60) Provisional application No. 63/342,038, filed on May 13, 2022.

(51) Int. Cl.
*H04L 29/00* (2006.01)
*H04L 9/08* (2006.01)

(52) U.S. Cl.
CPC .......... *H04L 9/0852* (2013.01); *H04L 9/0869* (2013.01)

(58) Field of Classification Search
CPC ............................ H04L 9/0852; H04L 9/0869
USPC ........................................................ 713/189
See application file for complete search history.

(56) References Cited

U.S. PATENT DOCUMENTS

| 6,593,566 B1 | 7/2003 | Pinto |
| 7,379,286 B2 | 5/2008 | Haisch |
| 11,133,758 B2 | 9/2021 | Moddel |
| 11,251,723 B2 | 2/2022 | Moddel |

OTHER PUBLICATIONS

Y. Kim, X. Fong, and K. Roy, "Spin-Orbit-Torque-Based Spin-Dice: A True Random-Number Generator," IEEE Magnetics Letts., vol. 6 (2015) 3001004.
Y. Wang, H. Cai, L. A. B. Naviner et al., "A novel circuit design of true random number generator using magnetic tunnel junction," 2016 IEEE/ACM International Symposium on Nanoscale Architectures (NANOARCH), Jul. 18-20, 2016, Beijing, China.

(Continued)

*Primary Examiner* — Jeffrey C Pwu
*Assistant Examiner* — Michael D Anderson
(74) *Attorney, Agent, or Firm* — John Alumit

(57) ABSTRACT

A Quantum Field Noise Source and Secure Information Transfer system for realizing a true random signal generator, without the need for a decipher key. Electrostatically-actuated microelectromechanical beams are disposed above and across a slotline to create parallel-plate cavities. The relationship between the beam-to-slotline distance ($d_1$) and the beam-to-electrode distance ($d_2$) is $d_1 < d_2/3$. The beams have a mechanical resonance frequency, $\omega_c$, and are driven by a sinusoidal voltage waveform of peak amplitude Vrf and frequency $\Omega_{rf}$, whose DC level is set to a voltage VCntrl and is applied to the beams through a parallel RLC circuit of resonance frequency $\Omega_0$. An input signal is applied to the slotline that propagates down the slotline and is influenced by the beams. The random vibrations modulate the signal across the slotline to create white noise that is decipherable by a copy apparatus with the same layout, frequencies, beam sizes, and materials.

4 Claims, 10 Drawing Sheets

(56) References Cited

OTHER PUBLICATIONS

Figure 1:
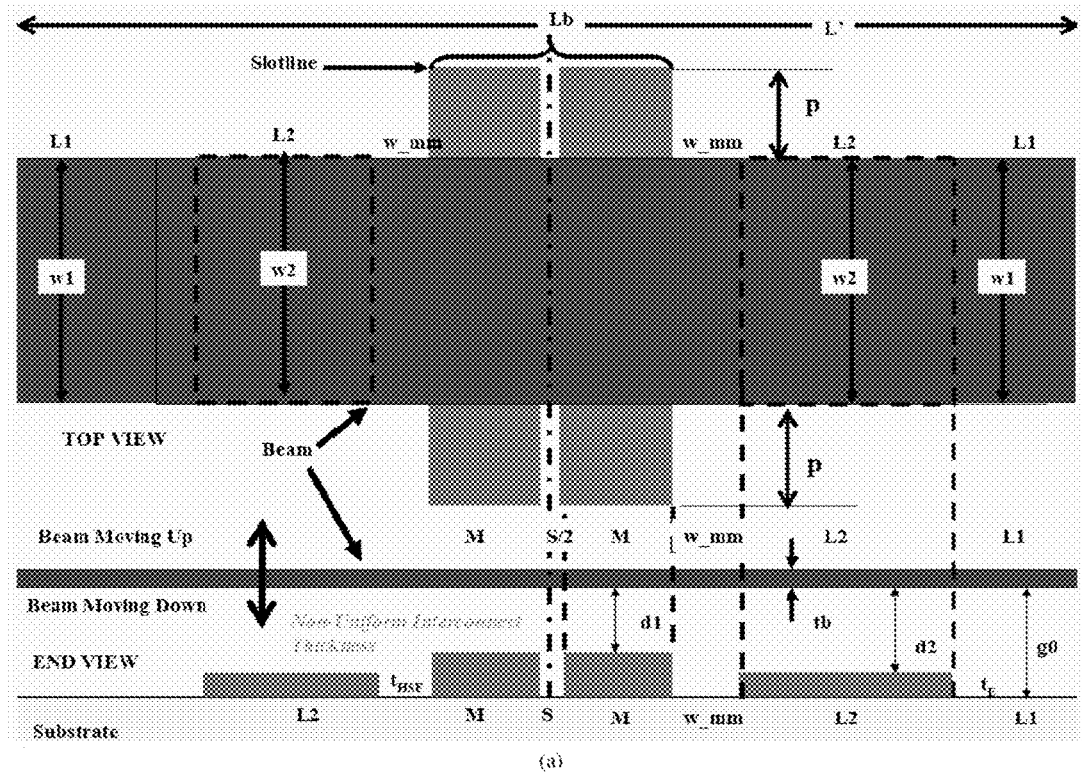
Figure 1:
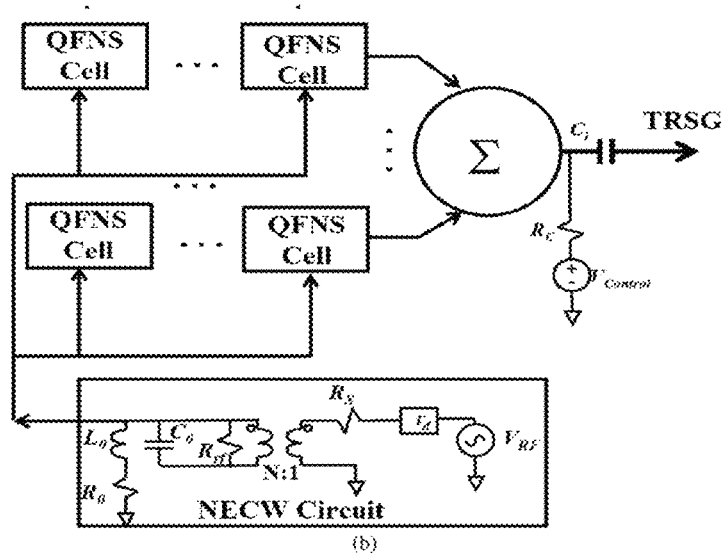

T. Figliolia, P. Julian_y, G. Tognetti, and A. G. Andreou, "A true Random Number Generator using RTN noise and a sigma delta converter," 2016 IEEE Int. Symp. on Circuits and Systems (ISCAS), May 22-25, 2016, Montreal, QC, Canada.

Y. Cao, C.-H. Chang, Y. Zheng, and X. Zhao, "An Energy-efficient True Random Number Generator Based on Current Starved Ring Oscillators," 2017 Asian Hardware Oriented Security and Trust Symposium (AsianHOST), Oct. 19-20, 2017, Beijing, China.

Jiang, H. et al. "A novel true random number generator based on a stochastic diffusive memristor," Nat. Commun. 2017, 8, 882.

H. Mulaosmanovic, T. Mikolajick, and S. Slesazeck, "Random Number Generation Based on Ferroelectric Switching," IEEE Electron Dev. Letts., vol. 39, No. 1, Jan. 2018, pp. 135-138.

M. Jerry, K. Ni, A. Parihar, A. Raychowdhury, and S. Datta, "Stochastic Insulator-to-Metal Phase Transition-Based True Random Number Generator," IEEE Electron Dev. Letts., vol. 39, No. 1, Jan. 2018, pp. 139-142.

B. Reulet, Method for generating random numbers and associated random number generator, U.S. Pat. No. 10,042,609 B2, Aug. 7, 2018.

O. Petura, "True random number generators for cryptography : Design, securing and evaluation," Doctoral Dissertation, Université de Lyon, 2019. English. ffNNT : 2019LYSES053ff. fftel-02895861.

K. Ibukuro, F. Liu, M. K. Husain et al. "Silicon single-electron random number generator based on random telegraph signals at room temperature," AIP Advances 10, 115101 (2020); https://doi.org/10.1063/5.0023647.

I. Dronyuk, M. Nazarkevych, and O. Fedevych, "Synthesis of Noise-Like Signal Based on Ateb-Functions," International Conference on Distributed Computer and Communication Networks DCCN 2015, pp. 132-140.

Gabriel, C. Wittmann, D. Sych, et al "A generator for unique quantum random numbers based on vacuum states," Nature Photonics 4, 711-715 (2010).

Symul, S. Assad, and P. K. Lam, "Real time demonstration of high bitrate quantum random number generation with coherent laser light," Applied Physics Letters 98, 231103 (2011).

Shi, B. Chng, and C. Kurtsiefer, "Random numbers from vacuum fluctuations," Applied Physics Letters 109, 041101 (2016).

Zheng, Y. Zhang, W. Huang et al "6 Gbps real-time optical quantum random number generator based on vacuum fluctuation," Review of Scientific Instruments 90, 043105 (2019).

Q. Zhou, R. Valivarthi, C. John et al. "Practical quantum random number generation based on sampling vacuum fluctuations," Quantum Engineering 1, e8 (2019).

B. Bai, J. Huang, G.-R. Qiao, "18.8 Gbps real-time quantum random number generator with a photonic integrated chip," Appl. Phys. Lett. 118, 264001 (2021); https://doi.org/10.1063/5.0056027.

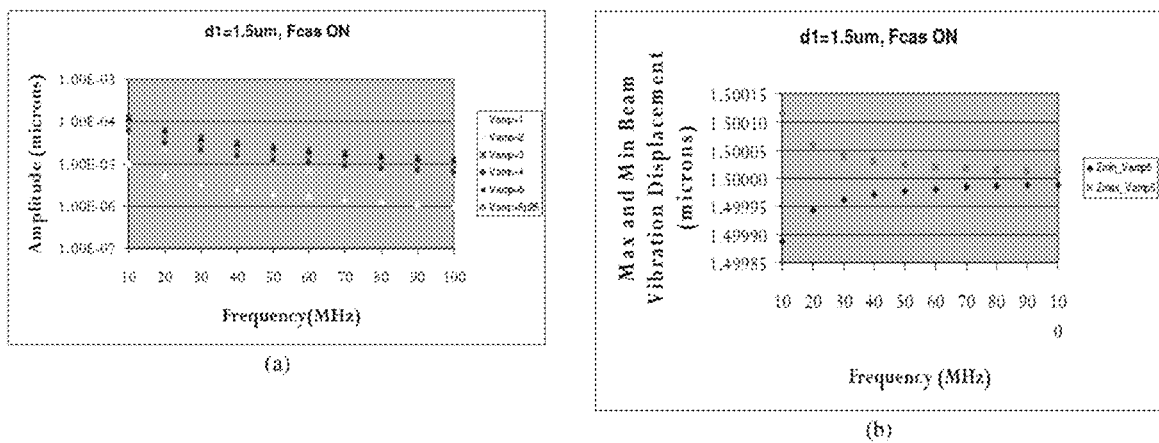
Fig. 12
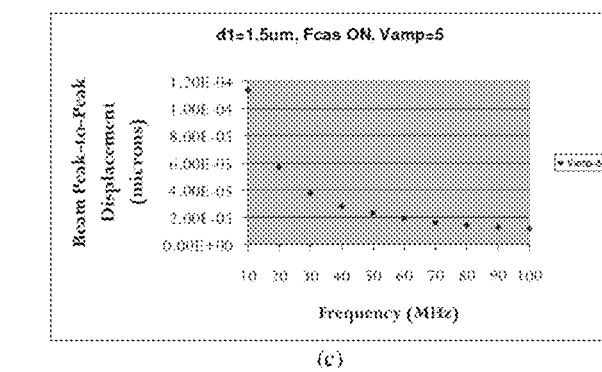
Fig. 13
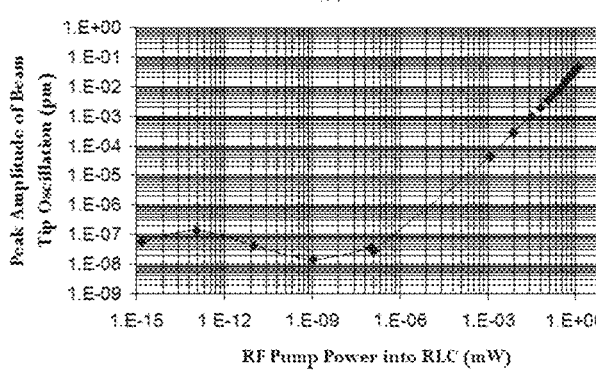
Fig. 14
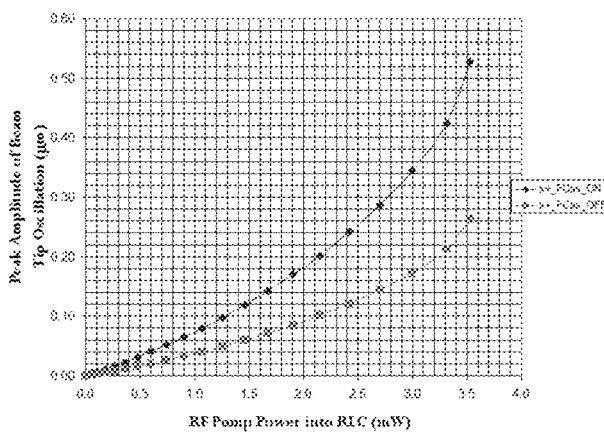

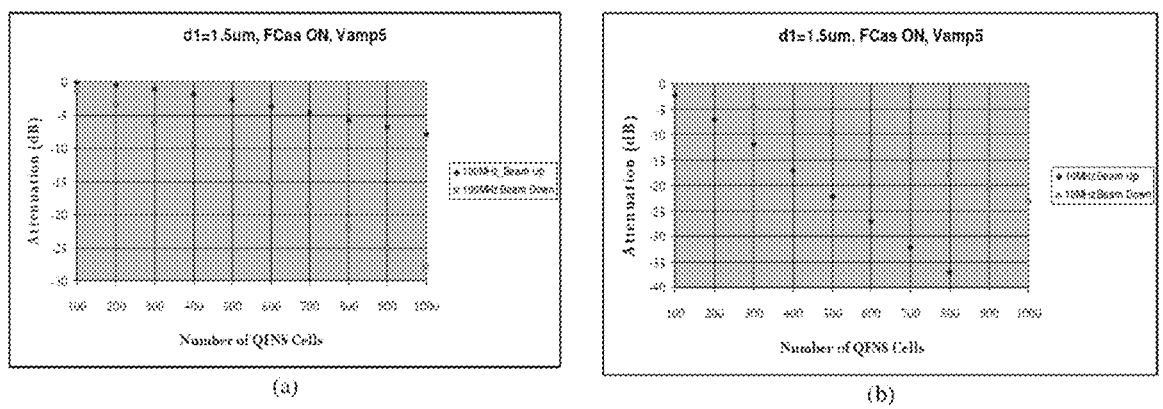
Fig. 16
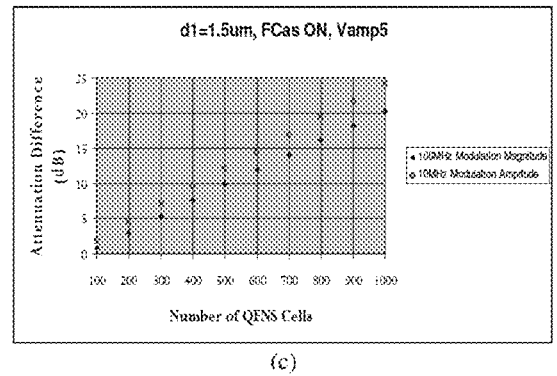

SYSTEM FOR QUANTUM FIELD NOISE SOURCE AND SECURE INFORMATION TRANSFER THEREFROM

CROSS-REFERENCE TO RELATED APPLICATION

Provisional Patent Application No. 63/342,038 filed on May 13, 2022.

FEDERALLY SPONSORED RESEARCH

Not Applicable

SEQUENCE LISTING OR PROGRAM

Not Applicable

BACKGROUND

The Problem of Secure Information Transfer. Information is transferred between a source and a destination. The media through which the information being transferred flows may include air/space, sea, wires, etc. To travel through these media, the information is impressed onto a carrier, which could be an optical or an electrical signal. Regardless of the medium through which the information-carrying signal travels, the signal may be intercepted. Intercepting the transmitted signal may, in turn, result in the unauthorized acquisition of the transmitted information, which may result in the loss of individual privacy and personal information, on the one hand, or "hacking," in the case of interconnected computer information systems/terminals. In this Internet age, the interception of information is an ever increasing problem due to the high value of the information flowing, which may be, not only that of a personal nature, but, in particular, of a business nature (e.g., company finances, bank accounts and credit cards), and/or pertaining to the control of autonomous and remotely-controlled vehicles, and others. There currently exists, therefore, an extreme need for preventing the possibility of the unauthorized interception of the transmitted information.

Causes of Key Problems with Security Information Transfer. Approaches to secure information transfer have traditionally relied on the generation and exploitation of random numbers (RNs), which are generally employed in two ways. In the case of communications systems, e.g., satellite communications, they are employed for effecting carrier modulation such that a replica of the RN used at the source is needed to demodulate or extract the information from the received signal at the destination. In the case of interconnected computer information systems, RNs are utilized to effect cryptographic encoding, in which the information is combined or scrambled with RNs in a fashion that can be undone with a "key;" this requires, however, the secure provision/distribution of the key to the information recipient(s). There are at least two problems that render prior art approaches inadequate and unable to guarantee total security in information transfer. The first one is that RNs are generated artificially by means of computer algorithms that produce RN sequences that eventually repeat. As a result, if the signal transmitted is monitored for a sufficiently long time, it may be deciphered and used to intercept the information. The second one is the need to find a secure way to also distribute, to the intended information recipients, the key that will allow undoing the encryption of the received information. The invention hereby disclosed provides, not only a way to generate a totally random signal, i.e., "white noise," and impress it onto an information carrier, but also a way to avoid the need for distributing/transferring a "key" to decipher the received encrypted information thus produced.

Prior-Art Approaches to True Random Signal Generators (TRSGs). True Random Number Generators (TRNGs) and True Random Signal Generators (TRSGs) have been, and are currently, an active topic of research [12] [19-35] due to mounting concerns regarding the security of the information being shared through the Internet and wireless services, in light of increasing transmission-intercepting ("hacking") incidents.

The State of the Art classifies Random Number Generators (RGNs) into four categories, based on the mechanism employed to generate the random numbers [27]. These have been defined as:

(1) Deterministic random number generators (DRNGs), which generate apparent random sequence of number sequences by way of a deterministic algorithm.
(2) True random number generators (TRNGs), which generate random numbers by exploiting intrinsically random phenomena present in nature such as, for instance, thermal noise, electromagnetic fluctuations, radioactive decay, or by exploiting incidental phenomena such as e.g. user input from keyboard and mouse, and the hard drive read/write operation delay.
(3) Hybrid true random number generators (HTRNGs), which derive their random numbers from a TRNG source. but then employ cryptographic post-processing to further improve the security and statistical properties of the generated numbers. It should be pointed out, however, that post-processing the output implies data compression, therefore an accompanying reduction of the output bit rate.
(4) Hybrid deterministic random number generators (HDRNGs), which employ a TRNG to periodically changing the seed of a DRNG; this enables the DRNG to generate a sequence based on real randomness.

A perusal of the literature identifies the following TRNG examples. In 2015, Kim et al. [19] proposed a three-terminal spin dice TRNG approach, which utilizes spin-orbit torque to hold a bi-stable perpendicular magnetic anisotropy nanomagnet in meta-stability and uses thermal noise as an entropy source to bias the magnet off its metastable state. Once the magnetization is tilted, the built-in anisotropy field of the magnet relaxes the magnetization to the stable state, producing a random bit whose value is determined solely by the thermal noise. In 2016, Wang et. al. [20] proposed a TRNG circuit using a magnetic tunnel junction (MTJ). Since one of the reliability issues in MTJ based circuits is the stochastic switching behavior due to thermal fluctuations, this was exploited to provide a perfect physical source of randomness. In 2016, Figliolia et al. [21], proposed a circuit architecture based on the perturbation of a Sigma-Delta modulator using random telegraph noise (RTN) coming from electrons that get trapped at the gate of a transistor. In 2017, Cao et al. [22] proposed a TRNG based on extracting the randomness from the jitter noise of two current-starved rings oscillators (ROs) with identical layout. The jitter noise was increased by lowering the oscillation frequency and reducing the average charging and discharging currents in the ROs. In 2017, Jiang et al. [23], demonstrated a TRNG by utilizing an Ag:SiO2-based diffusive memristor device (a device with randomly-changing resistance) to randomize the current in a circuit. In 2018, Mulaosmanovic et al. [24], proposed a TRNG based on FeFET that relies on the intrinsic stochastic switching variability of ultra-scaled FeFETs. In particular, the approach relies on the inherent randomness of the polarization reversal of ferroelectric domains in the gate stack. Also in 2018, Jerry et al [25] proposed an oscillator-based TRNG that exploited the inherently stochastic threshold switching in the insulator-to-metal transition (IMT) in vanadium dioxide. In addition, in 2018, Reulet [26], patented a method for generating random signal and associated random numbers from the random tunneling of charges from one conductor to another conductor across a quantum tunneling barrier. In 2019 [27] Peruta implemented TRNGs by utilizing logic devices (ASICs and FPGAs) operating on physical sources of randomness. In particular, he searched and exploited physical intrinsically random phenomena occurring inside logic devices originally designed to realize deterministic systems. In 2020, Ibukuro et al. [28], demonstrated a silicon single-electron random number generator based on random telegraph signals produced by the trapping and de-trapping of a single electron in an electrically defined Quantum Dot. A different approach to TRNG proposed in 2015 by Dronyuk et al. [29], this time on the algorithmic side, was the synthesis of "noise-like" signals based on periodic "Ateb-functions," the latter being the solutions to the nonlinear oscillator with multiple-degrees-of-freedom problem. This approach, however, requires the generation of pseudo-random numbers and, thus, a computer. Its allure is its flexibility to generate noise-like signals with prescribed amplitude distribution properties, e.g., Gaussian white noise-like.

Work on TRGNs that exploit quantum vacuum fluctuations, on the other hand, is exemplified by the following, which utilized optical homodyning techniques. In 2010, Gabriel et al. [30] applied a laser beam and the quantum vacuum state permeating space to a beam splitter; in 2011, Symul et al. [31] derived the random numbers from the vacuum field contained in the radio-frequency sidebands of a single-mode laser. In 2016, Shi et al. [32], and in 2019, Zheng et al. [33], derived the random numbers from a laser beam and vacuum fluctuations applied into a beam splitter. In 2019, Zhou et al. [34] derived random numbers from the vacuum fluctuations of the electromagnetic field inside a laser cavity. In 2021, Bai et al. [35] a homodyne technique was demonstrated in an 18.8 Gbps TRNG exploiting vacuum fluctuations by a laser beam that is processed by combining a photonic integrated chip and the technology of optimized randomness extraction.

In contrast to the state of the art which, either relies mostly on thermal noise-induced instabilities, or techniques based on optical homodyning, our invention exploits quantum vacuum fluctuations using radio-frequency MEMS techniques. Our concept/principle, which focuses on a core true random signal generator (TRSG), may be scaled up in frequency up to optical frequencies, if desired, by scaling down the beam size into the nanoscale, i.e., nanoelectromechanical systems (NEMS) and/or using advanced materials with large intrinsic stiffness such as graphene.

Prior Inventions involving MEMS and the Quantum Vacuum Fluctuations (Casimir Effect). A number of inventions that combine MEMS technology with quantum vacuum fluctuations have been disclosed [36]-[40]. These, however, do not teach the principles disclosed in the present invention. For instance, [36] pertains to the field of propulsion; [37] pertains to converting energy from the electromagnetic quantum vacuum available at any point in the universe to usable energy in the form of heat, electricity, mechanical energy or other forms of power; [38] pertains to modifying the quantum vacuum mode distribution within Casimir cavities so as to have the cavities drive charge carriers from or to an electronic device disposed adjacent to or contiguous with it; [39] pertains to modifying the zero-point energy density therein as compared to outside of a Casimir cavity so that, when the Casimir cavities are paired with product generating devices, the difference in zero-point energy densities is used to directly drive the generation of products, such as chemical reaction products or emitted light; and [40] pertains to devices in which quantum noise is reduced such as by incorporating the devices as part of or adjacent to a Casimir cavity so that the devices with reduced quantum noise can be paired with a free space electric device to allow for a difference in noise power between the two to be captured and thus enable energy harvesting and the generation of electrical energy [40]. This latter, in fact, by aiming at reducing quantum noise, teaches away from our present invention.

SUMMARY

A Quantum Field Noise Source and Secure Information Transfer apparatus and method for realizing a true random signal generator (TRSG) for application in secure encrypted communications and/or secure interconnected computer information systems, and that spreads spectrum-like modulation for secure/stealth communication systems, without the need for a key to decipher encrypted information. The claimed invention comprises a plurality of Quantum Field Noise Source cells ("QFNS CELLS") in the form of a plurality of electrostatically-actuated microelectromechanical beams ("MEMS beams") disposed above and across a slotline to create parallel-plate cavities. The cavities are delimited by the MEMS beams, actuation electrodes and the slotline beneath the cavities. Preferably, the thicknesses of the slotline and the actuation electrodes are unequal. The relationship between the MEMS beam-to-slotline distance ($d_1$) and the MEMS beam-to-electrode distance ($d_2$) is $d_1 < d_2/3$. The MEMS beams have a mechanical resonance frequency, $\omega_c$ and are driven by a sinusoidal voltage waveform (the "RF Pump") of peak amplitude Vrf and frequency $\Omega_{rf}$, whose DC level is set to a voltage VCntrl and is applied to the plurality of MEMS beams through a parallel RLC circuit of resonance frequency $\Omega_0$. An input signal is applied to the slotline that propagates down the slotline and is influenced by the plurality of MEMS beams disposed above and across the slotline. The random vibrations, in turn, modulate the signal across the slotline to create white noise. When the same apparatus is fabricated with the same layout, frequencies, beam sizes, and materials, the white noise is decipherable without the need for a key.

DRAWINGS

FIG. 1 True Random Signal Generator (TRSG). (a) Front view of QFNS MEMS beam cell. (b) Simplified architecture of overall TRSG system. S represents a passive combiner. NECW is the Non-equilibrium Cooling/Warming circuit.

Figure 2:
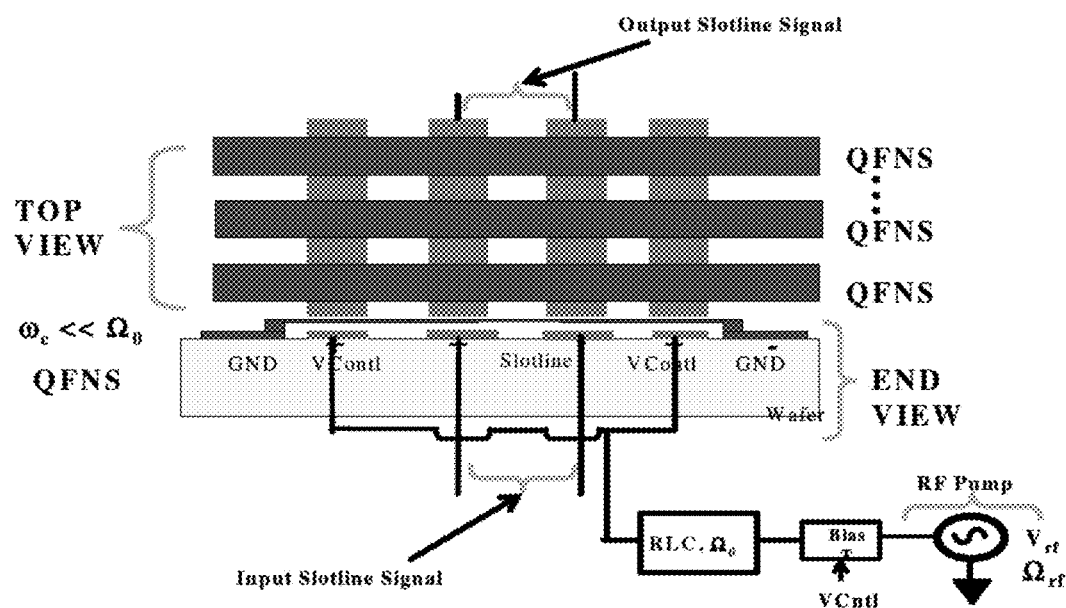

FIG. 2 Sketch of overall QNFS noise generator system. In this sketch, $\omega_c$ FIG. 3 Influence of external random forces on MEMS beam vibration. (Displacement exaggerated for the sake of clarity).

Figure 4:
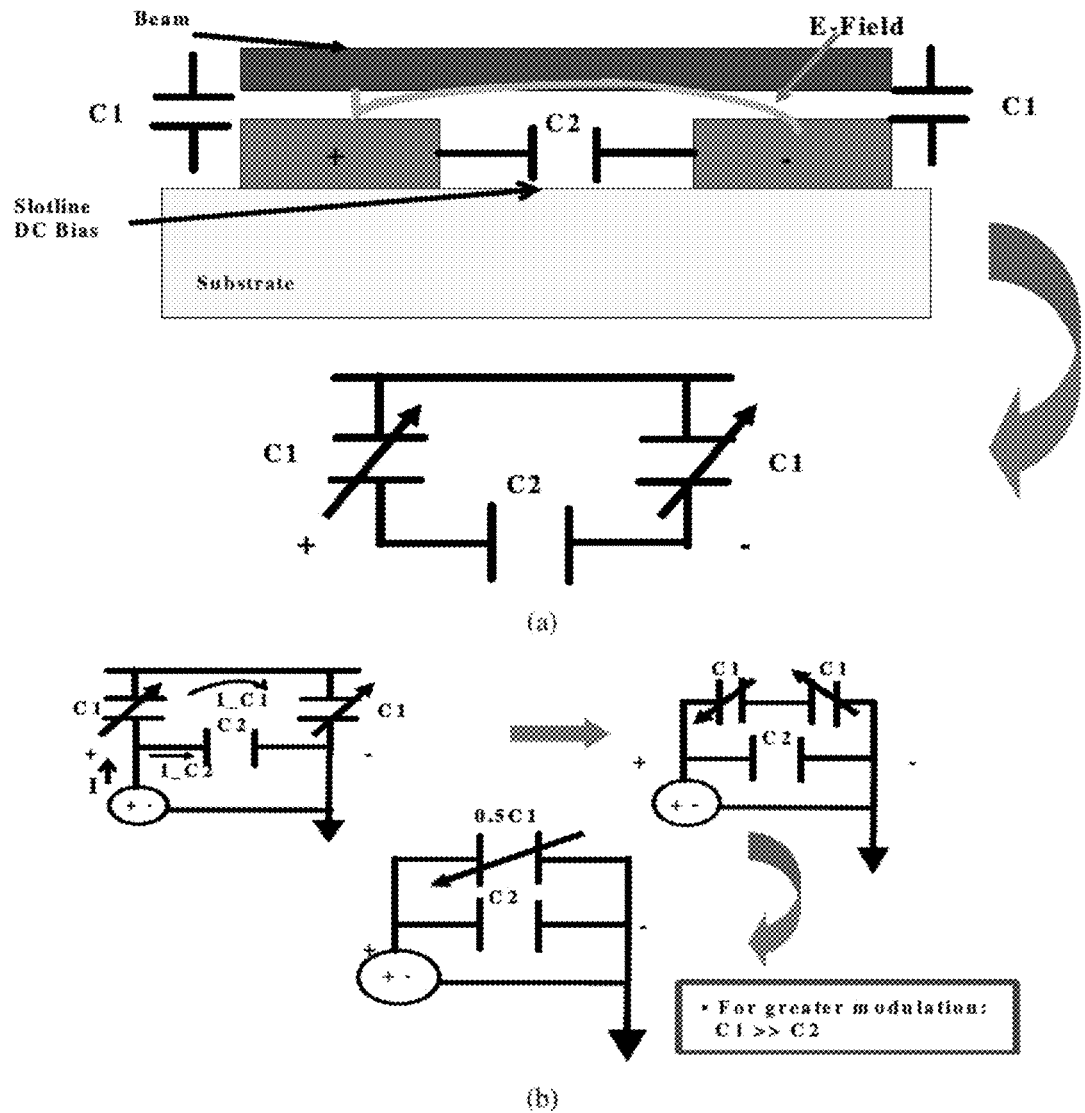

FIG. 4 (a) MEMS beam couples electric field due to signal propagating in slotline via beam-slotline stripes capacitances C1 and C2. (b) From the equivalent circuit shown here, to achieve greater modulation of the slotline signal, the beam/slotline gap must be such that C1>>C2.

Figure 5:
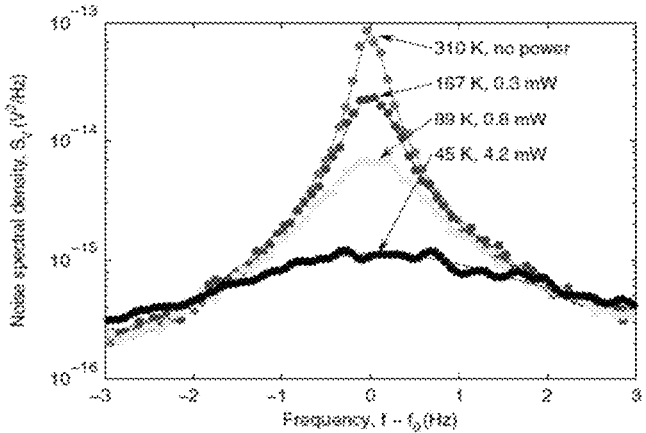

FIG. 5 Measured Noise Spectral Density (NSD) of a MEMS beam at resonance is reduced from $10^{-13}$-$10^{-15}$ $V^2$/Hz and settles quickly to ~$10^{-16}$ $V^2$/Hz just 3 Hz away from resonance. The beam had a width of W=200 $10^{-6}$ m, a length of $h_c$=1.5×$10^{-3}$ m, and a thickness of S=14×$10^{-6}$ m. Its mechanical resonance frequency was $f_c$=7 kHz[11].

Figure 6:
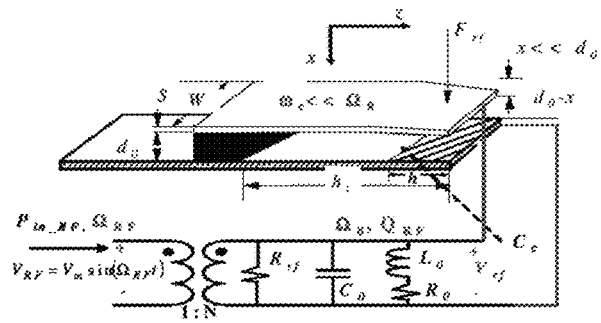

FIG. 6 Sketch of non-equilibrium cooled MEMS beam. Element values adopted: $Q_{RF}$=234, $L_0$=330 nH, $C_0$=7.676 pF, $R_0$=0.9 Ω, $\Omega_0/2\pi$=100 MHz, W=200×$10^{-6}$ m, $h_c$=1.5× $10^{-3}$m, h=200×$10^{-6}$m, S=14×$10^{-6}$m, $d_0$=16×$10^{-6}$m, $f_c$=7 kHz, $Q_c$=20000, N=1 [11].

Figure 7:
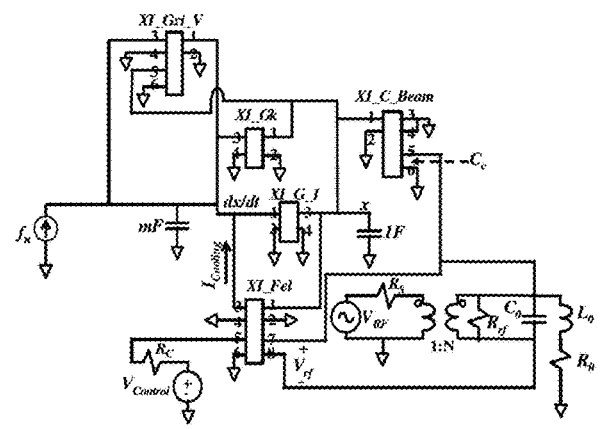

FIG. 7 Behavioral model of MEMS beam implemented in LTSPICE, including the nonequilibrium cooling system. Nodes labeled x, and dx/dt capture the beam tip displacement and velocity, respectively. The amplitude of the noise signal due the beam's Brownian motion appears across the beam's equivalent electrical capacitance Cc. The beam is biased by a DC voltage, $V_{Control}$.

Figure 8:
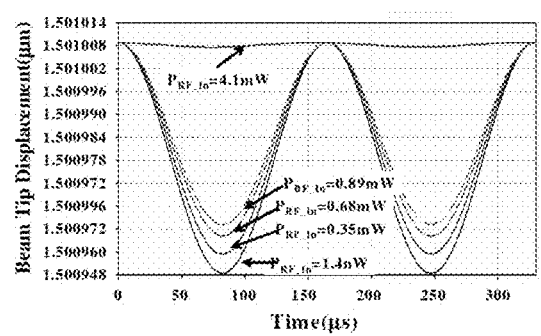

FIG. 8 Beam tip displacement versus time for various levels of NEC RF pump power.

Figure 9:
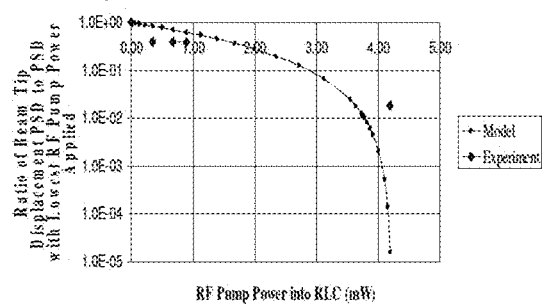

FIG. 9 Ratio of beam tip displacement's PSD to PSD at lowest RF pump power applied.

Figure 10:
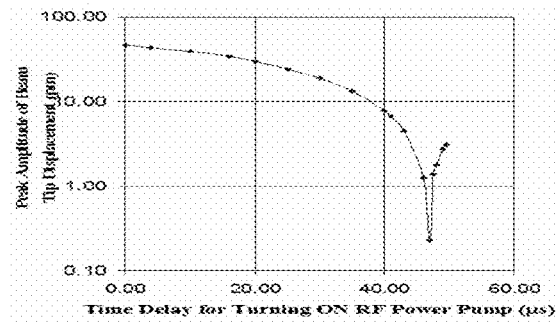

FIG. 10 Peak amplitude displacement due to Brownian noise may be decreased (non-equilibrium cooling) or increase (non-equilibrium warming) depending on the time delay ($\tau_d$) between the beginning of the beam motion and the turning ON of the RF pump.

Figure 11A:
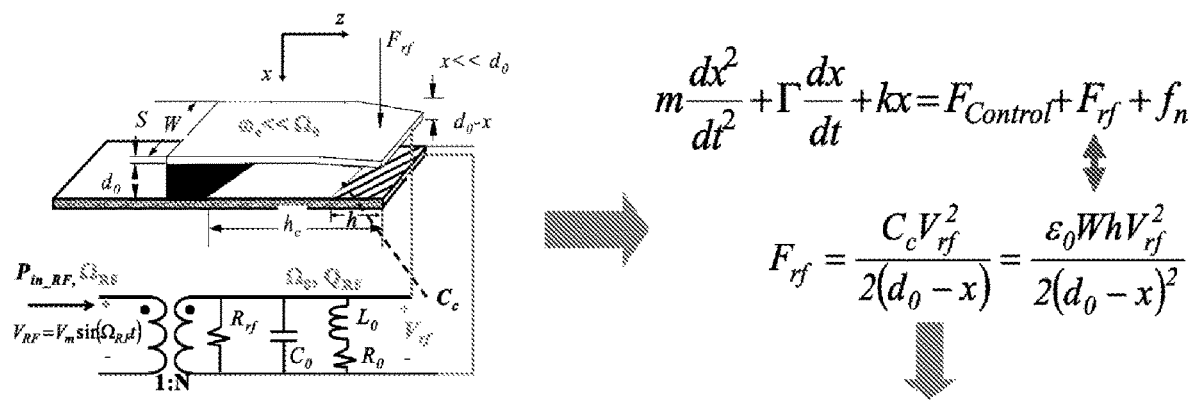
Figure 11B:
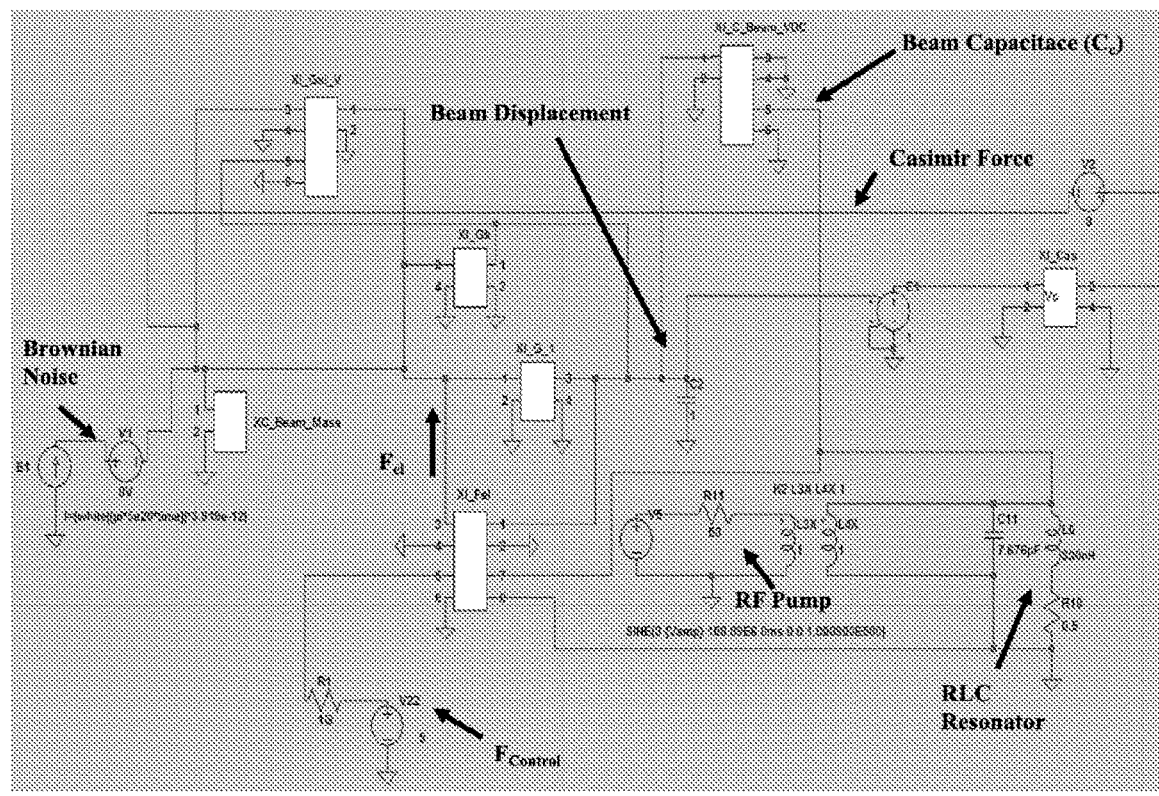

FIG. 11 (a) Sketch of system to generate true random noise. (b) Behavioral model for (a).

FIG. 12 (a) Beam displacement amplitude, (b) Maximum ($Z_{max}$) and minimum ($Z_{min}$) distance of MEMS beam displacement during vibration, and (c) Peak-to-Peak displacement, all versus frequency. The model includes the presence of the Casimir force, and the beam-to-slotline distance 1.5 um.

FIG. 13 Peak amplitude of beam tip oscillation due to Brownian noise as a function of RF pump power: (b) In picometers (pm) for power from 1.5×$10^{-15}$ to 1.26 mW. The beam parameters are: L1=40 µm, W1=135 µm, L2=120 µm, W2=135 µm, w_mm=15 µm, M=120 µm, S=20 µm, t_E=1 µm, g0=2.5 µm, d2=1.5 µm, d1=1.5 µm, t_HSE=1 µm, Lb=610 µm, tb=2 µm. Mass density=2908 Kg/$m^3$, Young's modulus=70 GPa. In these simulations $\tau_d$=0.

FIG. 14 Peak amplitude of beam tip oscillation in both the presence of Brownian noise, but the absence of Casimir force (x+_FCas_OFF), and in the presence of both Brownian and the Casimir force (x+_FCas_ON), as a function of RF pump power. In these simulations $\tau_d$=0.

Figure 15:
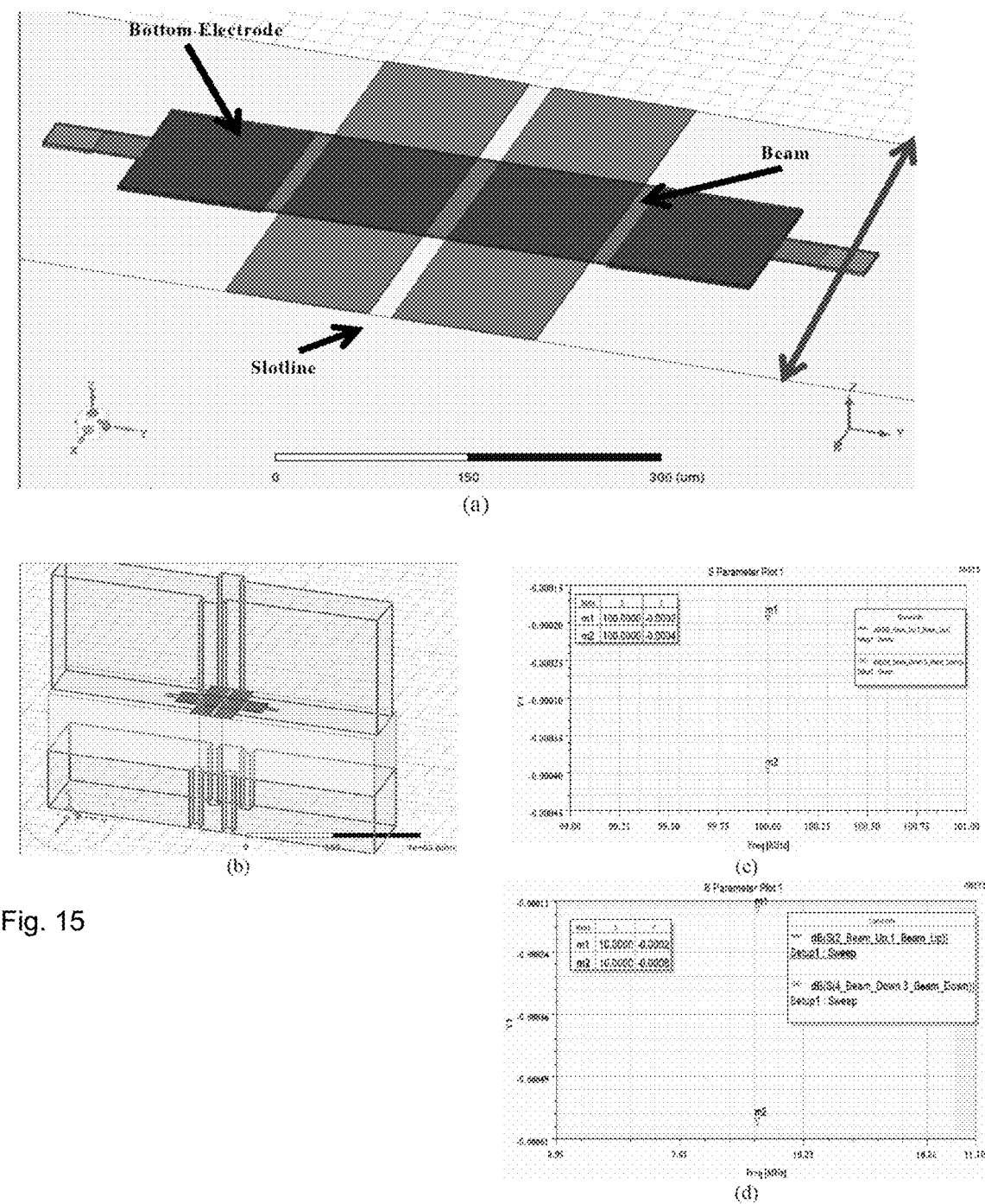

FIG. 15 (a) The QFNS cell consists of a MEMS beam and its driving bottom electrodes over a slot transmission line. (b) HFSS drawing of QFNS cell. (c) Transmission (S21) at 100 MHz for beam in upper (S21=−0.0002 dB) and lower (S21=−0.0004 dB) extremes of the vibratory motion. (d) Transmission (S21) at 10 MHz for beam in upper (S21=−0.0002 dB) and lower (S21=−0.0006 dB) extremes of the vibratory motion.

FIG. 16 Attenuation of signal propagating down the slotline under the QFNS MEMS beams at 100 MHz when all of them coincide at either their upper or lower extremes of their motion versus number of unit cells placed in cascade. (a) At 100 MHz. (b) At 10 MHz. (c) Comparison of the difference between attenuation in (a) at 100 MHz and (b) at 10 MHz.

DESCRIPTION

The invention, denoted Quantum Field Noise Source and Secure Information Transfer Therefrom, is a low power dissipation true random signal generator (TRSG) that exploits the Brownian motion-induced vibration of a microelectromechanical (MEMS) beam and the quantum vacuum (Casimir) force it experiences due to quantum-mechanical vacuum fluctuations in the cavity/space delimited by the beam and underlying bias electrodes and interconnect transmission line [1]-[5], to realize a TRSG for application in secure encrypted communications and/or interconnected computer information systems with perfect secrecy [6], [7] and spread spectrum-like modulation for secure/stealth communication systems [8], [35] see FIG. 1.

The general QFNS concept employs a non-equilibrium passive cooling/warming (NECW) technique [9]-[11] to decrease or increase, respectively [1], the noise in the amplitude of a MEMS beam's vibrations. Given the small size of the MEMS beams, arrays of many beams may be envisioned in an integrated circuit (IC) wafer to produce potentially large collective noise amplitudes without active amplification, the need for an electronic amplifier being one of the challenges in realizing TRSGs in prior art [12].

The QFNS cell depicted in FIG. 1(a) embodies an electrostatically-actuated microelectromechanical (MEM) bridge, disposed above and across a slotline, to create parallel-plate cavities. The cavities are delimited by the MEMS bridge/beam and its actuation/bias electrodes and the slotline underneath it. The typical embodiment of the structure, shown in FIG. 1(a), includes, 1) The thicknesses of the slotline and the actuation electrodes are unequal, to preclude a potential short-circuit between the electrodes and the deflected/actuated beam when not using a protecting dielectric over the electrodes; 2) The relationship between the beam-to-slotline distance and the beam-to-electrode distance, $d_1 < d_2/3$, to prevent pull-in [2] and achieve fatigue-limited beam life; and 3) The slotline itself, to tailor the power-handling properties of the device.

A sketch of the overall QFNS system is depicted in FIG. 2. In it, an input signal is applied to a slotline, propagates down the slotline, and is detected at the output of the slotline.

The MEMS beams, disposed over and across the slotline, have a mechanical resonance frequency, $\omega_c$, and are driven by a sinusoidal voltage waveform, the "RF Pump," of peak amplitude $V_{rf}$ and frequency $\Omega_{rf}$, whose DC level is set to a voltage VCntrl and is applied to the MEMS beam through a parallel RLC circuit of resonance frequency $\Omega_0$.

Figure 3:
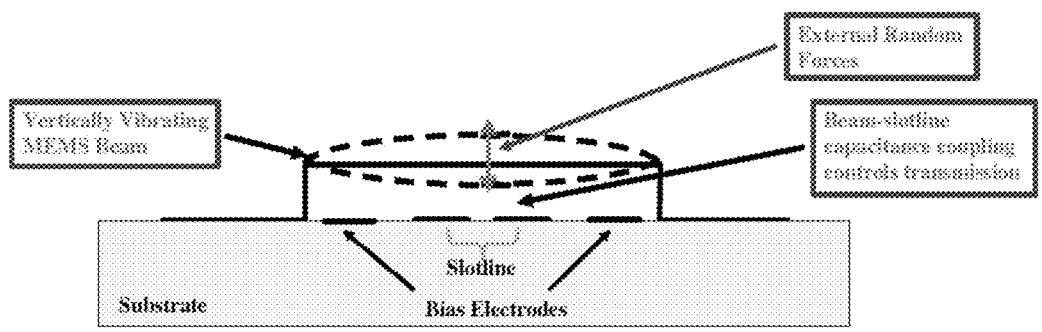

En-route to the output, the signal propagating down the slotline is influenced by the coupling to a series/array of MEMS beams disposed along it, whose random vibrations, in turn, modulate the signal across the slotline, FIG. 3.

The modulation of the signal across the slotline may be understood from FIG. 4. Essentially, the closer the beam approaches the slotline, the greater the influence of the beam vibration on the slotline signal amplitude. In particular, as the QFNS beam vibrates up and down, its distance from the slotline oscillates between the upper and lower vibration amplitude extremes shown in FIG. 3. This, in turn, modulates the attenuation suffered by the signal propagating down the slotline at the beam location (because the beam shunts the signal across the slot, thus less of it passes beyond the beam [2]), see FIG. 2. This modulation will be random, however, because the beam motion is random as a result of it being actuated by external random forces, in particular, Brownian forces and quantum vacuum fluctuations (manifested through the Casimir force). When the number of QFNS cells in cascade is increased beyond a single cell, as shown in FIG. 2, the effect of the small modulation in the transmission caused by a QFNS single cell is amplified. This is manifested in that, when all of the beams simultaneously reach the upper extreme or the lower extreme of their oscillatory displacement, the resulting transmission attenuation modulation will be the lowest or the greatest, respectively; the degree of signal attenuation accompanying its amplitude modulation will, in general, vary between those two extremes. Thus, if the overall transmission is successively measured at distinct times, a random set of transmission amplitudes will be obtained that is randomly distributed between the minimum and the maximum.

The effect of the overall QFNS system of FIG. 2 on an input signal to the slotline may be obtained experimentally by measuring the overall scattering parameters with a Vector Network Analyzer (VNA), or by observing the output time-domain waveform signal in an oscilloscope (Scope). In particular, the randomness of the modulation induced on the input signal allows making its amplitude at the output of the slotline random.

The invention hereby disclosed integrates two aspects. Firstly, by configuring the beams in such a way that the vibration amplitude randomness they experience is due to the perfectly random quantum vacuum fluctuations permeating all space [13], the randomness induced onto the input signal is white noise, i.e., also perfectly random. A way of experimentally determining this is via the Ljung-Box Test, described in Appendix A. And, secondly, by fabricating QFNS systems with the same layout, i.e., copies of one another, near each other, their responses to the quantum vacuum fluctuations, which are universal [13], result in them inducing indistinguishably similar randomness on the signals propagating through each of them. In other words, by way of our invention, it is possible to generate signals that are white noise, but deterministic, in the sense that they are random, yet can be purposefully, distinctly, and predictably generated with the "algorithm" composed of the interaction of the quantum vacuum fluctuations and the specific sample pair of devices in question, i.e., devices where one is a layout copy of the other and are fabricated near one another. In particular, the equivalent of an encryption key is already intrinsically embodied in the two (or more adjacently-fabricated with the same layout) devices and, consequently, one avoids the need for a distribution key. In this circumstance, unless one has possession of such a device pair, and uses one in the transmission and the other in the reception of information, the received signal can only be perceived as white noise; the information transmitted, therefore, cannot be intercepted/"cracked." This invention, therefore, enables implementation of the so-called one-time pad (OTP) encryption technique, see Appendix B. As originally introduced, non-equilibrium cooling (NEC) was intended to reduce the Brownian motion in a MEMS beam [9]-[11], in particular, as manifested at its mechanical resonance frequency. This is illustrated by the experimental results of Brown et al. [11] shown in FIG. 5.

Another aspect of this invention, not taught by NEC, is the opposite, i.e., non-equilibrium warming (NEW). NEW may be employed, in addition to organizing multiple MEMS beams in arrays, to increase the amplitude of the noise-induced beam vibrations. Furthermore, while the approach to NEC introduced in [11] only taught increasing the RF Pump's amplitude, Vrf, our approach to NEW may be achieved in two ways, namely, also increasing the RF Pump's Vrf, but also by changing the relative phase shift or time delay between the turn-on moment of the RF Pump signal and the beginning of the MEMS beam vibrations cycles.

Below, a behavioral model and validation for the MEMS beam in [11] under NEC and NEW conditions, and its application to the QFNS cell, is presented.

Behavioral Modeling of MEMS Beam for NEC and NEW. We have developed a behavioral model for a single MEMS beam that captures the reduction in Brownian noise due to non-equilibrium cooling and its increase due to non-equilibrium warming, FIG. 6.

The impact of Brownian motion on the MEMS structure embodying a single-degree-of-freedom (SDOF) system, e.g., FIG. 6, obeys the linear second-order ordinary differential equation:

$$m\frac{d^2x}{dt^2} + \Gamma\frac{dx}{dt} + kx = f_n \tag{1}$$

where t is time, m is the effective (lumped) beam mass (in units of Kg), $\Gamma$ is the viscous damping coefficient (in units of N-s/m or Kg/s) induced on the beam motion by the environment in which it is immersed, k is the beam stiffness, and $f_n$ can be viewed as normal white noise with zero mean and power spectral density:

$$S_{f_n}(\omega) = 4k_B\Gamma T (N^2/Hz) \tag{2}$$

where $k_B$ is Boltzmann's constant and T is the temperature in Kelvin. The effective beam mass, m, capturing the overall mass of the distributed beam, is obtained using Rayleigh's procedure with a quarter cosine wave U(z) as Rayleigh shape for a cantilever [11] as:

$$m = \rho W S L_{eff}, \tag{3}$$

where $\rho$ is the mass density per unit volume and $L_{eff}$ is the effective length of the deflected beam [11], $$L_{eff} = \frac{1}{h_c}\int_0^{h_c} U^2(z)dz. \tag{4}$$

In the NEC concept, an RF signal "pump" of power $P_{in\_RF}$ and frequency $\Omega_{rf}$, is applied to an RLC circuit with resonance frequency $\Omega_0 = 1/\sqrt{L_0(C_0+C_c)}$, whose output voltage, $V_{rf}$, drives a beam of fundamental mechanical resonance frequency $\omega_c \ll \Omega_0$ and capacitance $C_c$. In particular, $C_c$ is given by:

$$C_c = \frac{\varepsilon_0 Wh}{d_0 - x} \tag{5}$$

where x is the beam displacement. In FIG. 6, $R_{rf}$ represents additional damping across the beam due to the RF force interaction with the charged beam [11]. The RF pump causes the MEMS beam to be excited by the force $F_{rf}$, given by:

$$F_{rf} = \frac{C_c V_{rf}^2}{2(d_0 - x)} = \frac{\varepsilon_0 Wh V_{rf}^2}{2(d_0 - x)^2} \tag{6}$$

According to Wineland et al. [10], when this force is applied such that its phase shift relative to the motion reaches a certain phase shift with respect to the motion of the beam, it is possible for it to oppose the velocity of the beam, leading to cooling. In particular, "such cooling may enable reaching the quantum regime of cantilever motion," i.e., its harmonic oscillator equivalent will be occupied by just a few phonons [14].

To develop the behavioral modeling of the MEMS beam under NEC, we consider it to have a motion dictated by, $$m\frac{dx^2}{dt^2} + \Gamma\frac{dx}{dt} + kx = F_{Control} + F_{rf} + f_n \quad (7)$$

where, $F_{control}$, $F_{rf}$ and $f_n$ represent the electrostatic, RF pump-derived ("cooling"), and Brownian forces, respectively. The behavioral model entails finding a circuit representation of (7), which is given in FIG. 7, [15, 16].

Equation (7) captures the behavior of the MEMS beam of FIG. 6. where $d_0 >> 1$ μm and, therefore, the Casimir effect is not active. To include the effect of the Casimir effect (which derives from quantum vacuum fluctuations) we have to add to the right-hand side of (7) a Casimir force term, namely, $$\frac{F_{Casimir}}{A} = -\frac{\pi^2 \hbar c}{240}\frac{1}{x^4} \quad (8)$$

where h is Planck's constant divided by 2π, c is the speed of light, and x is the separation between beam and drive electrode [4]. FIG. 7 and Tables 1 and 2 show the behavioral MEMS beam model and parameters, excluding the Casimir force.

TABLE I

MEMS BEAM MODEL PARAMETERS USED IN EQUATIONS AND THEIR DEFINITIONS

| Model Parameters | Definition | Parameter Values |
|---|---|---|
| c | Speed of Light | 299792458 m/s |
| $\varepsilon_0$ | Vacuum Permittivity | 8.854 ×10$^{-12}$ F/m |
| $\varepsilon_1$ | Relative Permittivity | 3 |
| $x_0$ | Displacement corresponding to applied DC bias | 1.5 μm |
| $k_B$ | Boltzmann Constant | 1.38066 × 10$^{-23}$ J/K |
| $d_0$ | Beam-Actuation Electrode Distance | 16 μm |
| W, S, $h_c$ | Beam Width, Thickness, Length | 200 μm, 14 μm, 1.5 mm |
| h | Electrode Length | 200 μm |
| ρ | Beam Material Density | 2330 Kg/m$^3$ |
| k | Beam Spring Constant | 19.93 N/m |
| $f_c$ | Beam Resonance Frequency | 7 KHz |
| Γ | Beam Viscous Damping Coefficient | $2\pi f_c m/Q_c = 2.152054 \times 10^{-8}$ |
| E | Beam's Young's Modulus | 169 × 10$^9$ Pa |
| T | Temperature | 310K |
| $t_d$ | Electrode Dielectric Thickness | 0.0 μm |

TABLE 2

IMPLEMENTATION OF CIRCUIT MODEL FOR PASSIVELY COOLED MEMS BEAM

| Circuit ID | Definition | Circuit Implementation |
|---|---|---|
| $f_n$ | Brownian noise | Current source of value: I = (white((2π · 10$^6$ · time)) · 3.919 × 10$^{-12}$) |
| m | Beam Mass | Capacitor of m Farads |
| $V_{Control}$ | Beam DC Bias producing force $F_{Control}$ | DC voltage source of value: 55.5 V |
| $R_C$ | $V_{Control}$ output resistance | Resistor of value: 1GΩ |
| XI_Fel | Sub-circuit defining cooling force ($I_{Control}$) | G_Fel 0 3 value = $\left\{\frac{h_c \cdot W \cdot \varepsilon_0 \cdot (V(7, 8) + V(5, 6))^2}{(2 \cdot ((d_0 - x_0) - (V(1, 2))))^2}\right\}$ |
| XI_Gxi_V | Damping coefficient time displacement derivative | G_Gxi_V 3 0 value = {V(1, 2) · Γ} |
| XI_Gk | Spring constant times displacement | G_Gk 3 0 value = {V(1, 2) · k} |
| XI_G_I | Unity Conductance | G_G_1 3 0 value = {−1 · V(1, 2)} |
| XI_C_Beam | Beam Capacitance | C_Beam 5 6 Q = $\frac{V(5, 6) \cdot \varepsilon_0 \cdot h_c \cdot W}{((d_0 - (V(1, 2)) + t_d/\varepsilon_r))}$ |

TABLE 2-continued

IMPLEMENTATION OF CIRCUIT MODEL FOR PASSIVELY COOLED MEMS BEAM

| Circuit ID | Definition | Circuit Implementation |
|---|---|---|
| $R_{rf}$ | Damping due to the rf force | Resistor of value: 10.85Ω |
| $R_S$ | RF source impedance | Resistor of value: 50Ω |
| N | Transformer secondary turns | Value: 1 |
| $f_{RF}$ | RF source frequency | Frequency value: 100.09 MHz |

In FIGS. 8 through 10 we show results from the behavioral model obtained by simulating the MEMS beam, FIG. 6, with physical characteristics described in the experiments of Brown et al. [11]. FIG. 10, in particular, shows that at a particular delay time between the beginning of the RF "pump" cycle and the MEMS beam displacement, one can obtain non-equilibrium "warming." This may be a mechanism to further augment the Brownian noise amplitude, when applied to an array of multiple devices.

Behavioral Modeling of QFNS Device The large MEMS beam discussed above was fabricated [11] using a standard Bosch reactive-ion-etching process [4]. Considerations involved in implementing the QFNS device in a surface micromachining fabrication [4] process compatible with integrated circuit (IC) technology and the processes found in commercial MEMS foundries dictated that it have smaller dimensions.

The QFNS dimensions, in turn, are linked to its "design space" which entailed understanding the effect of the various quantities listed in Table 1, with the goal of determining the most appropriate QFNS cell dimensions, FIG. 1(a) [2].

TABLE 3

Elements comprising the QFNS "design space."

$$k = \frac{32Ewt^3}{L^3} \cdot \frac{1}{2-\left(2-\frac{w}{L}\right)\cdot\left(\frac{w}{L}\right)^2}$$

$$C_m = L \cdot w \cdot t \cdot \rho$$

$$f_0 = \frac{1}{2\pi}\sqrt{\frac{k}{C_m}}$$

$$V_{PI} = \sqrt{8 \cdot \frac{k}{27 \cdot \varepsilon_0 \cdot W_e \cdot L_e} \cdot d_1^3}$$

$$F_{Casimir} = \frac{2Mw\hbar\pi^2 c_0}{240(d_1 - x)^4}$$

Parameters:
k is the MEMS beam spring constant;
w, t, and L are its width, thickness and length, respectively;
E is the Young's modulus;
ρ its mass density;
$W_e$ and $L_e$ are the width and length of the actuation electrode; and
$d_1$ is the beam-to-actuation electrode distance.
$F_{Casimir}$ is the Casimir force;
M is the width of the slotline stripes;
$\hbar$ is Planck's constant divided by $2\pi$;
$c_0$ is the speed of light in vacuum,
x is the beam displacement.

In particular, the beam length should not be too large so that it doesn't show excessive "sag" due to gravity at its center, the beam-to-bottom electrode or slotline distance and width should not be too small, to facilitate beam "release" during fabrication, but it should not be too large so that it precludes entering the regime in which the Casimir effect (and thus the quantum vacuum field) is operative [1], [3], and its thickness should not be too large so that a low stiffness can be attained and, thus, low resonance frequency and pull-in voltage. A typical set of dimensions is given in Table 4.

TABLE 4

Typical geometrical dimensions QFNS cell. All dimensions in microns.

| | L1 | W1 | L2 | W2 | w_mm | M | S | t_E | g0 | $d_2$ | f | $d_1$ | t_HSE | Lb | tb |
|---|---|---|---|---|---|---|---|---|---|---|---|---|---|---|---|
| U | 40 | 135 | 120 | 135 | 15 | 120 | 20 | 1 | 2.5 | 1.5 | — | 1.5 | 1 | 610 | 2 |

The corresponding beam parameters for the mechanical model of the QFNS beam were: k=5.572 N/m and $C_m$=0.4789E-9 Kg, with resonance frequency $f_0$=17.17 KHz and pull-in voltage $V_{PI}$=6.2V. In Table 2, the beam-to-slotline and electrodes distance is the same, namely, $d_2$=1.5 μm. This is appropriate for the intended application, namely, generating true random (white) noise by extracting or sampling the Brownian noise inherent in a MEMS beam at a given temperature [3] and quantum vacuum randomness manifested through the Casimir force when the distance between the MEMS beam and the bottom metallization is of the order of 1 um or less [4]. The QFNS behavioral model, now including the Casimir force, is the implementation sketched in FIG. 11.

In the system of FIG. 11, the RF "pump" is applied to a parallel RLC circuit whose center frequency is caused to vary in time as the MEMS beam vibrates and, thus, its capacitance ($C_c$), in parallel with the RCL, also varies. In non-equilibrium cooling, when the goal is to cancel the Brownian noise-induced motion of the MEMS beam at its resonance frequency, the result of this is that a force, $F_{el}$, which consists of the high frequency of the RF pump (100.09 MHz [11]) modulated by the slow beam vibration frequency (~17 kHz), is applied to the beam such as to oppose the beam's velocity; this force is controlled by the RF pump amplitude and the RLC characteristics (we employed the RLC parameters of [11]: R=0.9Ω, C=7.676 pF, L=330 nH); away from resonance, the Brownian noise is still present, but highly diminished. To generate true noise away from resonance, e.g., at 10 MHz or 100 MHz, the RF pump amplitude is increased to drive the beam into as large a vibration amplitude as possible, but without causing it to be actuated, i.e., to experience pull-in, where it would collapse onto the slotline underneath it. The higher RF Pump amplitude drives the beam into its nonlinear regime, where harmonics are generated, see the equation for $F_{rf}$ in FIG. 11(*a*). Using the behavioral model in FIG. 11(*b*), we calculated the vibration amplitude, the Casimir force and, from a Fourier analysis of the amplitude waveform, the vibration amplitude at several frequencies. Below, we show some results of our design space exploration, FIG. 12.

FIG. 13 shows simulations conducted in the absence of the Casimir force for a QFNS cell with MEMS beam of dimensions given there. It is seen that both NEC, at an input power of approximately $10^{-9}$ mW, and NEW, at an input power greater than $10^{-5}$ mW, are manifested. The expectation is, then, that in the presence of the Casimir force, the peak-to-peak amplitude will increase due to the additional vacuum fluctuations-induced noise; this is seen in FIG. 14.

The purpose of the RF Pump and beam DC bias is to cause the beam to come as close as possible to the slotline underneath during its oscillations so that quantum vacuum fluctuations, and hence the Casimir force they induce, dominate any other forces due to their preponderance, derived from the expression $F_{Casimir} \propto (d_1-x)^{-4}$. In the absence of the RF Pump and DC bias, this predominance of the impact of quantum vacuum fluctuations on MEMS beam's vibration may be attained if the distance between beam and the slotline and bottom electrodes underneath it is substantially smaller than 1 μm [3], in which case the QFNS system would operate with zero power consumption. In this regime, the quantum vacuum fluctuations permeating space power the random beam vibrations. As was seen in a section reviewing the prior art, this zero power consumption operation is a unique feature of our invention.

Frequency Modeling of QFNS Device. According to the illustration in FIG. 4, as the QFNS beam vibrates up and down, its distance from the slotline oscillates between the upper and lower extremes, calculated with its behavioral model and shown in FIG. 12. This, in turn, modulates the attenuation suffered by the signal propagating down the slotline. This modulation will be random, because the beam motion is random as a result of Brownian motion and quantum vacuum fluctuation (manifested through the Casimir force). By increasing the number of beams in cascade, FIG. 2, the effect of the small attenuation caused by each single cell, when all of the beams in them coincide at their upper extreme and the lower extreme of their oscillatory displacement, is magnified. This is illustrated in FIG. 15, which shows the HFSS model of a single QFNS unit cell and its calculated transmission parameter (S21) at 100 MHz and 10 MHz. The transmission properties for multiple cascaded QFNS cells was obtained numerically in MATLAB, by combining the scattering parameters 2×2 matrix for the single cell, calculated in HFSS, as a function of the total number of cascaded cells, N. FIG. 15(*b*) shows such attenuation in dB and FIG. 15(*c*) shows the difference in attenuation in dB at 10 MHz and 100 MHz; these frequencies are taken as prototypical for generating true white noise at 10 MB/s and 100 MB/s rates, respectively.

The amplitude of the propagating signal will experience the infusion of a random change that fluctuates between those shown in FIG. 16(*a*), (*b*). From FIG. 16(*c*) it is surmised that a clearly discernible noise modulation should be exposed as the number of unit cells increases. Of course, discerning the noise modulation will be a function also of the sensitivity of the receiver detecting the noise signal.

REFERENCES

[1] H. J. De Los Santos, Secure Communications, Invention Disclosure #NMR141230_04 and Quantum Field Communications, Invention Disclosure #NMR200320_01.

[2] H. J. De Los Santos, High-Reliability Micro-Electro-Mechanical System (MEMS) Switch Apparatus and Method: U.S. Pat. No. 7,414,500 B2, Aug. 19, 2008.

[3] H. J. De Los Santos, "Impact of the Casimir Force on Movable-Dielectric RF MEMS Varactors, IEEE Nanotechnology Conference, NANO'03, August 12-14, San Francisco, CA.

[4] H. J. De Los Santos, Principles and Applications of NanoMEMS Physics, Dordrecht, The Netherlands: Springer, October, 2005.

[5] T. B. Gabrielson, "Mechanical-Thermal Noise in Acoustic and Vibration sensors," IEEE Trans. Electron Dev. Vol. 40, NO. 5. MAY 1993, pp. 903-909.

[6] Available: [Online]: https://en.wikipedia.org/wiki/One-time_pad

[7] C. Shannon, "Communication Theory of Secrecy Systems," Bell System Technical Journal, 28(4), 1949.

[8] R. C. Dixon, Spread Spectrum Communications with Commercial Applications, Third Edition, John Wiley & Sons, Inc., New York, 1994.

[9] D. J. Wineland and W. M. Itano, "Laser cooling of atoms," Phys. Rev. A 20, 1521(1979).

[10] D. J. Wineland et al., "Cantilever cooling with radio frequency circuits," Available: [Online]: http://arxiv.org/PS_cache/quant-ph/pdf/0606/0606180v1.pdf

[11] K. R. Brown, J. Britton, R. J. Epstein, J. Chiaverini, D. Leibfried, and D. J. Wineland, "Passive Cooling of a Micromechanical Oscillator with a Resonant Electric Circuit," Phys. Rev. Letts. 99, 137205 (2007).

[12] C. S. Petrie and J. A. Connelly, "A Noise-Based IC Random Number Generator for Applications in Cryptography," IEEE Trans. Circuits and Systems—I: Fundamental Theory and Apps., Vol. 47, No. 5, May 2000, pp. 615-621.

[13] P. W. Milonni, The Quantum Vacuum (Academic, San Diego, 1994).

[14] A. Lambrecht and S. Reynaud, "Casimir Effect: Optomechanics in Quantum Vacuum," arXiv:1109.0150

[15] D. Mercier, P. Blondy, D. Cros, P. Guillon, "An electromechanical model for MEMS switches," Proc. IEEE Int. Microwave Symp., Phoenix, AZ, USA, 20-25 May 2001; pp. 2123-2126.

[16] A. Lazaro, A. Girbau, "Phase Noise Modelling in Parallel-plate MEMS variable capacitors," Proc. of 2009 Spanish Conference on Electron Devices, Santiago de Compostela, Spain, 11-13 Feb. 2009; pp. 266-269.

[17] Available: [Online]: https://en.wikipedia.org/wiki/One-time_pad

[18] Available: [Online]: https://en.wikipedia.org/wiki/Cryptographic_hash_function

[19] Y. Kim, X. Fong, and K. Roy, "Spin-Orbit-Torque-Based Spin-Dice: A True Random-Number Generator," IEEE Magnetics Letts., Vol. 6 (2015) 3001004.

[20] Y. Wang, H. Cai, L. A. B. Naviner et al., "A novel circuit design of true random number generator using magnetic tunnel junction," 2016 IEEE/ACM International Symposium on Nanoscale Architectures (NANOARCH), 18-20 Jul. 2016, Beijing, China.

[21] T. Figliolia, P. Julian_y, G. Tognetti, and A. G. Andreou, "A true Random Number Generator using RTN noise and a sigma delta converter," 2016 IEEE Int. Symp. on Circuits and Systems (ISCAS), 22-25 May 2016, Montreal, QC, Canada.

[22] Y. Cao, C.-H. Chang, Y. Zheng, and X. Zhao, "An Energy-efficient True Random Number Generator Based on Current Starved Ring Oscillators," 2017 Asian Hardware Oriented Security and Trust Symposium (Asian-HOST), 19-20 Oct. 2017, Beijing, China.

[23] Jiang, H. et al. "A novel true random number generator based on a stochastic diffusive memristor," Nat. Commun. 2017, 8, 882.

[24] H. Mulaosmanovic, T. Mikolajick, and S. Slesazeck, "Random Number Generation Based on Ferroelectric Switching," IEEE Electron Dev. Letts., Vol. 39, NO. 1, January 2018, pp. 135-138.

[25] M. Jerry, K. Ni, A. Parihar, A. Raychowdhury, and S. Datta, "Stochastic Insulator-to-Metal Phase Transition-Based True Random Number Generator," IEEE Electron Dev. Letts., Vol. 39, NO. 1, January 2018, pp. 139-142.

[26] B. Reulet, Method for generating random numbers and associated random number generator, U.S. Pat. No. 10,042,609 B2, Aug. 7, 2018.

[27] O. Petura, "True random number generators for cryptography: Design, securing and evaluation," Doctoral Dissertation, Université de Lyon, 2019. English. ffNNT: 2019LYSES053ff. ffel-02895861

[28] K. Ibukuro, F. Liu, M. K. Husain et al. "Silicon single-electron random number generator based on random telegraph signals at room temperature," AIP Advances 10, 115101 (2020); https://doi.org/10.1063/5.0023647

[29] I. Dronyuk, M. Nazarkevych, and O. Fedevych, "Synthesis of Noise-Like Signal Based on Ateb-Functions," International Conference on Distributed Computer and Communication Networks DCCN 2015, pp 132-140.

[30] Gabriel, C. Wittmann, D. Sych, et al "A generator for unique quantum random numbers based on vacuum states," Nature Photonics 4, 711-715 (2010).

[31] Symul, S. Assad, and P. K. Lam, "Real time demonstration of high bitrate quantum random number generation with coherent laser light," Applied Physics Letters 98, 231103 (2011).

[32] Shi, B. Chng, and C. Kurtsiefer, "Random numbers from vacuum fluctuations," Applied Physics Letters 109, 041101 (2016).

[33] Zheng, Y. Zhang, W. Huang et al "6 Gbps real-time optical quantum random number generator based on vacuum fluctuation," Review of Scientific Instruments 90, 043105 (2019).

[34] Q. Zhou, R. Valivarthi, C. John et al. "Practical quantum random number generation based on sampling vacuum fluctuations," Quantum Engineering 1, e8 (2019).

[35] B. Bai, J. Huang, G.-R. Qiao, "18.8 Gbps real-time quantum random number generator with a photonic integrated chip," Appl. Phys. Lett. 118, 264001 (2021); https://doi.org/10.1063/5.0056027

[36] F. Pinto, Method and apparatus for particle acceleration, U.S. Pat. No. 6,593,566, Jul. 15, 2003.

[37] B. Haisch, G. Moddel, Quantum vacuum energy extraction, U.S. Pat. No. 7,379,286, May 27, 2008.

[38] G. Moddel, Quantum vacuum fluctuation devices, U.S. Ser. No. 11/133,758, Sep. 28, 2021

[39] G. Moddel, Systems for driving the generation of products using quantum vacuum fluctuations, U.S. Ser. No. 11/251,723, Feb. 15, 2022.

[40] G. Moddel, Quantum noise power devices, U.S. Ser. No. 11/258,379, Feb. 22, 2022.

REFERENCES OF APPENDICES

[A.1] https://en.wikipedia.org/wiki/Ljung%E2%80%93Box_test
[A.2] G. M. Ljung; G. E. P. Box (1978). "On a Measure of a Lack of Fit in Time Series Models". Biometrika. 65 (2): 297-303
[A.3] https://machinelearningmastery.com/white-noise-time-series-python
[A.4] https://itl.nist.gov/div898/handbook/pmc/section4/pmc4481.htm
[A.5] https://www.wolfram.com/mathematica/new-in-10/expanded-time-series-processes/investigatetime-series-model-residuals.html
[A.6] MATHEMATICA 12.3
[A.7] https://en.wikipedia.org/wiki/Chi-squared_distribution
[A.8] https://en.wikipedia.org/wiki/Autoregressive_integrated_moving_average
[A.9] https://en.wikipedia.org/wiki/P-value
[A.10] https://passel2.unl.edu/view/lesson/9beaa382bf7e/8#:~:text=ln%20a%20chi%2Dsquare%20analysis%2C%20the%20p%2Dvalue%20is,being%20due%20to%20mere%20chance.
[B.1] Available: [Online]: https://en.wikipedia.org/wiki/One-time_pad
[B.2] Available: [Online]: https://en.wikipedia.org/wiki/Cryptographic hash function

APPENDIX A. UNDERSTANDING THE LJUNG-BOX TEST

Success of the QFNS performance may be shown by testing the whiteness of the noise produced. This may be accomplished by determining how close to white noise are the amplitudes of the output time-domain waveform time series. For this purpose, the Ljung-Box test [A.1]-[A.6], a well known and widely used technique to detect white noise in a time series, may be employed. A widely used tool to effect the Ljung-Box test in the software package MATHEMATICA [A.16]. Next, we briefly explain the nature of this test.

The Ljung-Box test is a statistical test of whether any group of autocorrelations of the residuals[1] $P_k$ of a model fitting a time series are different from zero [C.1]. The autocorrelations of the residuals at a number of lags[2] k, are combined to give the statistic [A.1]-[A.6], $$Q_{LB} = n(n+2)\sum_{k=1}^{h} \frac{\rho_k^2}{n-k} \quad (A.1)$$

n being the sample size, and h the number of lags being tested (normally taken as, h=ln(n)); this is referred to as a chi-square distribution with h−1 degrees of freedom, $\chi_h^2$. The Chi-square test [A.7] is a statistical test used to determine if experimental data supports a particular hypothesis.

[1] A residual (or fitting deviation), is an observable estimate of the statistical error.
[2] The "lag" is the time shift between two time series whose autocorrelation is being computed.

To prepare for the Ljung-Box test, the time series in question is first curve-fitted by a model such as the autoregressive integrated moving-average (ARIMA) model [A.8]. The software MATHEMATICA [A.16] tests a variety of autoregressive models, e.g., autoregressive average (AR), moving average (MA), autoregressive moving average (ARMA), and seasonal ARMA (SARIMA), and chooses the model providing the best approximation fitting the time series. Then, from the residuals $P_k$ of this model, the statistic $Q_{LB}$ is calculated and compared with $\chi^2_{1-\alpha;h}$. This refers to the $(1-\alpha)$-quantile[3] of the Chi-squared distribution with h degrees of freedom. They embody the entries in a Chi-square table, see Table A.1. The parameter $\alpha$ is the significance level, that is, the probability of inadvertently rejecting the null hypothesis when, in fact, it should not because it is true. For white noise tests, usually $\alpha=0.05$.

[3] In statistics and probability, quantiles are cut points dividing the range of a probability distribution into continuous intervals with equal probabilities, or dividing the observations in a sample in the same way.

Now, since $Q_{LB}$ is Chi-squared distributed, its probability of occurrence, called the "p-value"[4], versus the number of lags, can be obtained from the Chi-square distribution table, to a desired significance level $\alpha$, and displayed as a plot. As per Eq. (A.1), the p-values [A.9] for $Q_{LB}$ depend on the degrees of freedom of the distribution, and are obtained as follows [A.9]. The calculated value of QLB, from the time series curve-fitting model residuals, is compared to the entry values $\chi^2_{1-\alpha;h}$ in the Chi-square distribution table for the desired $\alpha$. Given the degrees of freedom, identified by the row number in the table, and the desired significance level (identified by the $\alpha$ values heading the columns of the table), if $Q_{LB} > \chi^2_{1-\alpha;h}$, the entry in column $1-\alpha$, then the time series is white noise. The Ljung-Box test, then, consists in interpreting such a plot, see FIG. A.1, as follows. Suppose the null hypothesis, that the series is white noise, is the sought-after p-value. The plot includes a dashed line that demarcates the 95% confidence limit, FIG. A.1. The whole procedure is automated in MATHEMATICA's [A.16] "LjungBoxplot" tool and yielded our results.

[4] The p-value is the probability of obtaining test results that are at least as extreme as those observed, under the assumption that the null hypothesis is correct.

Figure 17:
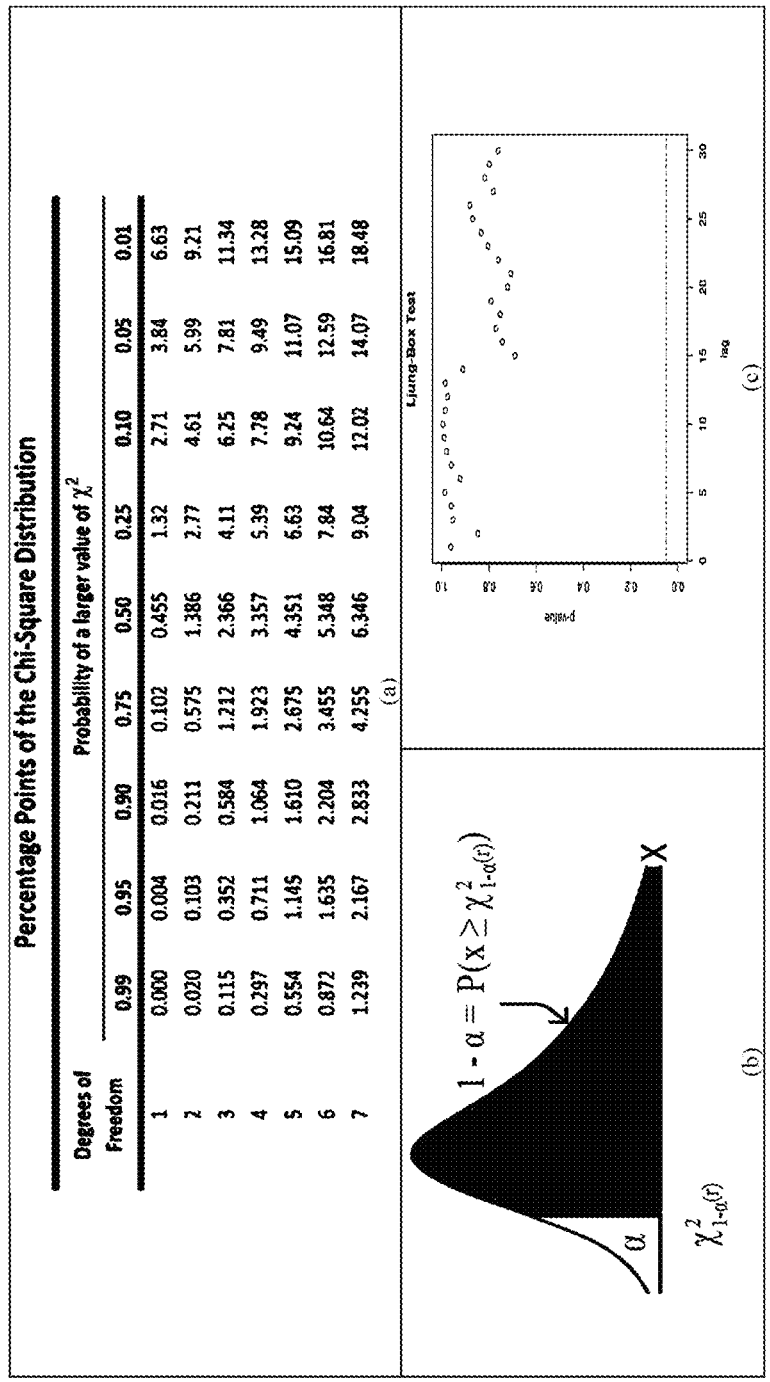

Referring to FIG. 17. (a) Sample Chi-Square ($\chi^2$) Distribution Table. (b) Typical plot of the $\chi^2$ distribution; the p-value is the area under the curve, After [A.10]. (c) Typical Ljung-Box plot of p-values versus lags. Since the p-values are greater than $\alpha=0.05$ (the dashed line), the time series from which they derive is white noise.

In addition to the Ljung-Box test, randomness of a noise source is characterized in MATHEMATICA [A.16] by the Entropy, H. Given a time series of n samples with amplitudes $X_1$ occurring with probability $p_i$, the noise source entropy is given by, $$H = -\sum_{i=1}^{n} p(x_i)\log_2 p(x_i) \quad (A.2)$$

in units of bits. For a source producing a total N amplitudes, its maximum entropy is given by, $$H_{max} = \frac{\text{Ln}[N]}{\text{Ln}[2]} \quad (A.3)$$

in units of bits. An interesting figure of merit is the percent entropy, which is given by, $$\text{Percent}\_H = \frac{H}{H_{max}} \quad (A.4)$$

Intuitively, the Percent_H gives an index of what percentage of the N possible amplitudes that are produced by a noise source are random. A Percent_H=100 means that ALL amplitudes produced by the source are random.

APPENDIX B. THE ONE-TIME PAD (OTP) ENCRYPTION TECHNIQUE

According to Wikipedia [B.1], in the field of cryptography, the term "one-time pad" (OTP) refers to an encryption technique that cannot be cracked, but instead, requires using a single-use pre-shared key of length no smaller than the message being sent. In the usual implementation of this technique, a plain-text is paired with a random secret key (also referred to as a one-time pad). Then, each bit or character of the plain text is encrypted by combining it with the corresponding bit or character from the pad using modular addition. The resulting ciphertext will be impossible to decrypt or break if the following four conditions are met:

1) The key must be at least as long as the plain text.
2) The key must be random (uniformly distributed in the set of all possible keys and independent of the plain text), entirely sampled from a non-algorithmic, chaotic source such as a hardware random number generator. It is not sufficient for OTP keys to pass statistical randomness tests as such tests cannot measure entropy, and the number of bits of entropy must be at least equal to the number of bits in the plain text. For example, using cryptographic hashes[5] [B.2] or mathematical functions (such as logarithm or square root) to generate keys from fewer bits of entropy would break the uniform distribution requirement, and therefore would not provide perfect secrecy.
3) The key must never be reused in whole or in part.
4) The key must be kept completely secret by the communicating parties. [5] A cryptographic hash function (CHF) is a mathematical algorithm that maps data of an arbitrary size (often called the "message") to a bit array of a fixed size (the "hash value", "hash", or "message digest") [5]. It is a one-way function, that is, a function for which it is practically infeasible to invert or reverse the computation. Ideally, the only way to find a message that produces a given hash is to attempt a brute-force search of possible inputs to see if they produce a match, or use a rainbow table of matched hashes. Cryptographic hash functions are a basic tool of modern cryptography.

What is claimed:

1. An apparatus for Quantum Field Noise Source and Secure Information Transfer Therefrom to realize a true random signal generator (TRSG) for application in secure encrypted communications and/or secure interconnected computer information systems, and spread spectrum-like modulation for secure/stealth communication systems, without the need for a key to decipher encrypted information, COMPRISED OF a plurality of Quantum Field Noise Source cells ("QFNS CELLS") in the form of a plurality of electrostatically-actuated microelectromechanical beams ("MEMS beams") disposed above and across a slotline to create parallel-plate cavities;

said cavities are delimited by the at least one MEMS beam, actuation electrodes and the slotline beneath said cavities;

the relationship between the MEMS beam-to-slotline distance ($d_1$) and the MEMS beam-to-electrode distance ($d_2$) is $d_1 < d_2/3$;

said plurality of MEMS beams have a mechanical resonance frequency, $\omega_c$, and are driven by a sinusoidal voltage waveform (the "RF Pump") of peak amplitude $V_{rf}$ and frequency $\Omega_{rf}$, whose DC level is set to a voltage VCntrl and is applied to the plurality of MEMS beams through a parallel RLC circuit of resonance frequency $\Omega_0$;

wherein, an input signal applied to the slotline propagates down the slotline and is influenced by the plurality of MEMS beams disposed above and across the slotline, whose random vibrations, in turn, modulate the signal across the slotline to create white noise; and wherein by fabricating the apparatus with the same layout, frequencies, beam sizes, and materials, said white noise is decipherable without the need for a key.

2. The apparatus of claim 1, wherein the thicknesses of the slotline and the actuation electrodes are unequal.

3. A method for Quantum Field Noise Source and Secure Information Transfer therefrom utilizing the apparatus of claim 1, comprising the steps of:

disposing a plurality of Quantum Field Noise Source cells ("QFNS CELLS") in the form of a plurality of electrostatically-actuated microelectromechanical beams ("MEMS beams") above and across a slotline to create parallel-plate cavities;

delimiting said cavities by the at least one MEMS beams, actuation electrodes and slotline beneath said cavities;

setting the relationship between the MEMS beam-to-slotline distance ($d_1$) and the MEMS beam-to-electrode distance ($d_2$) to $d_1 < d_2/3$;

setting a mechanical resonance frequency, $\omega_c$, to said plurality of MEMS beams driven by a sinusoidal voltage waveform (the "RF Pump") of peak amplitude Vrf and frequency $\Omega_{rf}$, whose DC level is set to a voltage VCntrl and is applied to the plurality of MEMS beams through a parallel RLC circuit of resonance frequency $\Omega_0$;

applying an input signal to the slotline which propagates down the slotline and is influenced by the plurality of MEMS beams disposed above and across the slotline, whose random vibrations, in turn, modulates the signal across the slotline to create white noise; and fabricating an apparatus copy with the same layout, frequencies, beam sizes, and materials as the original apparatus so that the resulting white noise from both apparatus is decipherable without the need for a key.

4. The method of claim 3, wherein the thicknesses of said slotline and actuation electrodes being unequal.

* * * * *